United States Patent
Kim et al.

(10) Patent No.: US 10,439,179 B2
(45) Date of Patent: Oct. 8, 2019

(54) RECHARGEABLE BATTERY MODULE INCLUDING WELDING BUSHES

(71) Applicant: SAMSUNG SDI CO., LTD., Yongin-si, Gyeonggi-do (KR)

(72) Inventors: Young-Deok Kim, Yongin-si (KR); Ji-Soon Lim, Yongin-si (KR); Shi-Dong Park, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 267 days.

(21) Appl. No.: 15/333,234

(22) Filed: Oct. 25, 2016

(65) Prior Publication Data

US 2017/0141367 A1 May 18, 2017

(30) Foreign Application Priority Data

Nov. 16, 2015 (KR) .................. 10-2015-0160500

(51) Int. Cl.
*H01M 2/10* (2006.01)
*H01M 10/613* (2014.01)
(Continued)

(52) U.S. Cl.
CPC ....... *H01M 2/1077* (2013.01); *H01M 2/1061* (2013.01); *H01M 2/206* (2013.01);
(Continued)

(58) Field of Classification Search
CPC .... H01M 2/1077; H01M 10/647; H01M 2/10; H01M 2/1016; H01M 2/1061; H01M 6/42
See application file for complete search history.

(56) References Cited

U.S. PATENT DOCUMENTS

2010/0321868 A1* 12/2010 Yang .................. H01M 2/1066
361/679.01
2010/0323234 A1* 12/2010 Kim ...................... H01M 2/206
429/158
(Continued)

FOREIGN PATENT DOCUMENTS

DE  10 2011 120 247 A1   6/2013
EP  2 518 814 A1   10/2012
(Continued)

OTHER PUBLICATIONS

European Office Action dated Apr. 6, 2018, of the corresponding European Patent Application No. 16198995.9.
(Continued)

*Primary Examiner* — Imran Akram
(74) *Attorney, Agent, or Firm* — Lee & Morse, P.C.

(57) ABSTRACT

A rechargeable battery module may include: a plurality of unit cells arranged in a first direction and electrically coupled via a bus bar, including a pair of outermost unit cells at opposite ends of the first direction; an end plate supporting the outermost unit cells; side plates at opposite ends of a second direction to support side surfaces of the unit cells; a support member supporting the unit cells at a lower end of a third direction; and welding bushes extended in the third direction at opposite ends of the end plate in the second direction and opposite ends of the side plates in the first direction. Each welding bush may include a cylinder member to which the end plate and one of the side plates are welded, and a cap member combined with at least one of opposite ends of the cylinder member.

12 Claims, 9 Drawing Sheets

(51) Int. Cl.
*H01M 10/625* (2014.01)
*H01M 2/20* (2006.01)
*H01M 10/6554* (2014.01)

(52) U.S. Cl.
CPC ....... *H01M 10/613* (2015.04); *H01M 10/625* (2015.04); *H01M 10/6554* (2015.04); *H01M 2220/20* (2013.01)

(56) References Cited

U.S. PATENT DOCUMENTS

| | | | |
|---|---|---|---|
| 2011/0159348 A1 | 6/2011 | Park et al. | |
| 2013/0330587 A1* | 12/2013 | Takahashi | H01M 2/1077 429/99 |
| 2015/0004469 A1* | 1/2015 | Park | H01M 2/1077 429/151 |
| 2015/0140406 A1* | 5/2015 | Kim | H01M 2/1077 429/156 |

FOREIGN PATENT DOCUMENTS

| | | |
|---|---|---|
| EP | 2 819 210 A1 | 12/2014 |
| JP | 2013-122819 A | 6/2013 |
| KR | 10-2011-0075369 A | 7/2011 |

OTHER PUBLICATIONS

European Search Report dated Jan. 23, 2017, of the corresponding European Patent Application No. 16198995.9.

\* cited by examiner

RECHARGEABLE BATTERY MODULE INCLUDING WELDING BUSHES

CROSS-REFERENCE TO RELATED APPLICATION

Korean Patent Application No. 10-2015-0160500, filed on Nov. 16, 2015, in the Korean Intellectual Property Office, and entitled: "Rechargeable Battery Module," is incorporated by reference herein in its entirety.

BACKGROUND

1. Field

The described technology relates generally to a rechargeable battery module for accommodating a plurality of unit cells.

2. Description of the Related Art

A rechargeable battery differs from a primary battery in that it may be repeatedly charged and discharged, while the latter is incapable of being recharged. Low-capacity rechargeable batteries are used in small portable electronic devices such as mobile phones, notebook computers, and camcorders, while high-capacity rechargeable batteries can be used as power sources for driving motors of a hybrid vehicle, an electric vehicle, and the like.

The rechargeable battery may be used as a single cell in small electronic devices, as a module in which a plurality of cells are electrically coupled, such as one for driving a motor, and as a pack in which a plurality of modules are electrically coupled.

SUMMARY

A rechargeable battery module according to exemplary embodiments may include: a plurality of unit cells arranged in a first direction and electrically coupled via a bus bar, including a pair of outermost unit cells at opposite ends of the first direction; an end plate to support the outermost unit cells; side plates provided at opposite ends of a second direction crossing the first direction to support side surfaces of the unit cells; a support member supporting the unit cells at a lower end of a third direction crossing the second direction; and welding bushes extended in the third direction at opposite ends of the end plate in the second direction and opposite ends of the side plates in the first direction, the welding bushes being connected to the end plate and the side plates, and combined with the support member by a penetrating fastening member. Each welding bush may include a cylinder member to which the end plate and one of the side plates are welded, and a cap member combined to at least one opposite ends of the cylinder member, the cap member increasing a corresponding surface area to which the load is applied.

The cylinder member may be connected to one end of the end plate and one end of one of the side plates.

One end of the end plate may make curved-surface contact with the cylinder member to be welded thereto, and one end of one of the side plates may make line contact with an end portion of the cylinder member or the end plate to be welded thereto.

The cap member may include an insertion portion that includes a through-hole at a center and is combined with an inner circumferential surface of the cylinder member, and a flange portion extended outward of the through-hole at one side of the insertion portion and supporting an end portion of the cylinder member.

The flange portion may have a width that is greater than a thickness of the cylinder member in a diameter direction of the cylinder member.

The insertion portion may have an inclined surface that is inclined at the inner circumferential surface of the cylinder member with respect to a diametrical center thereof.

The fastening member may penetrate the cap member and the cylinder member to be fastened with a fastening hole of the support member.

The cap member may include an insertion portion having a through-hole and a flange portion extended outward of the through-hole from the insertion portion, and the fastening member is a bolt that penetrates the through-hole of the insertion portion in the cap member provided at an upper end of the cylinder member to be screw-coupled to the fastening hole of the support member.

A bolt head of the fastening member may be supported by the flange portion of the cap member that is provided at an upper end of the cylinder member.

The flange portion of a cap member that is provided at a lower end of the cylinder member may be supported by the support member.

The support member may be a cooling plate that is provided in a bottom plate of a pack or an apparatus for supporting the unit cells.

The support member may be formed of aluminum, the cylinder member may be formed of stainless steel, and the cap member may be formed of steel having lower strength than the cylinder member.

The cap member may include an upper member combined to the upper end of the cylinder member to increase a corresponding surface area for the fastening member, and a lower member combined to the lower end of the cylinder member to increase a corresponding surface area for the support member.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
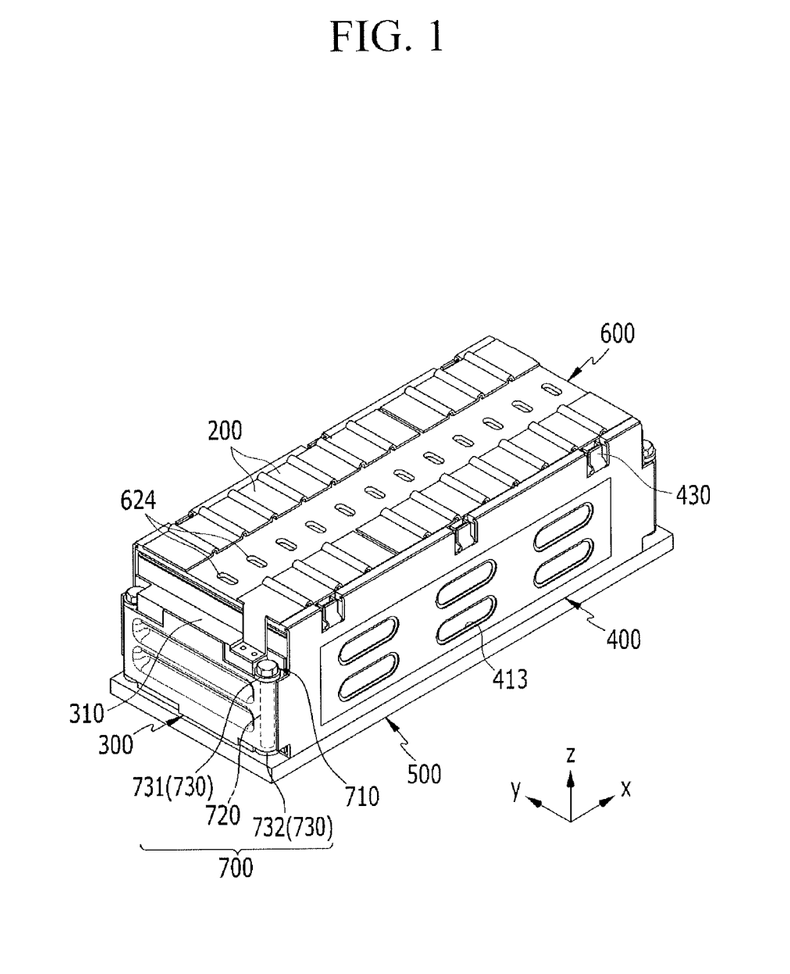
FIG. 1 illustrates a perspective view of a rechargeable battery module according to an exemplary embodiment.
Figure 2:
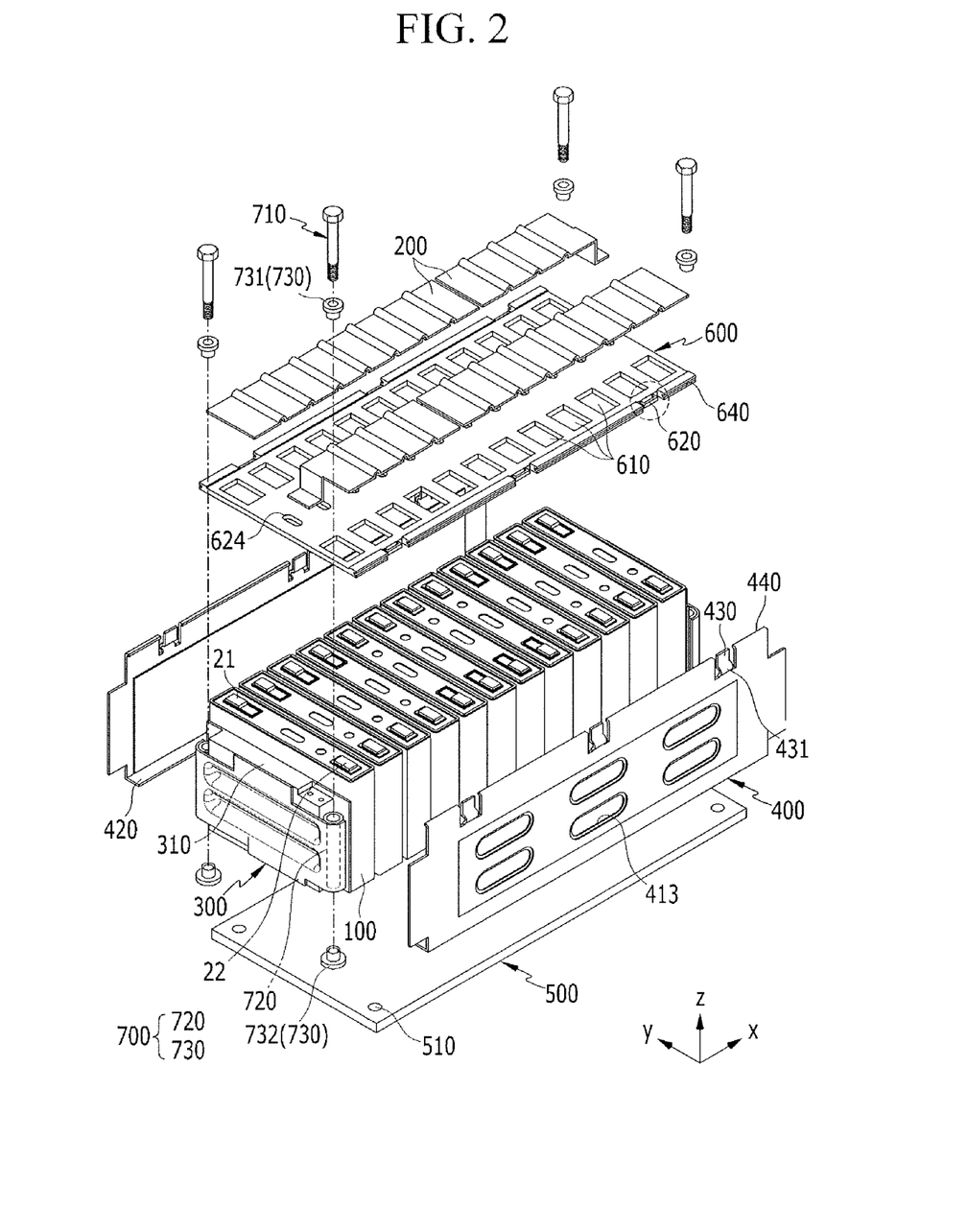
FIG. 2 illustrates an exploded perspective view of the rechargeable battery module applicable to FIG. 1.

FIG. 1 illustrates a perspective view of a rechargeable battery module according to an exemplary embodiment, and FIG. 2 is an exploded perspective view of the rechargeable battery module applicable to FIG. 1. Referring to FIGS. 1 and 2, the rechargeable battery module of the exemplary embodiments may include: unit cells 100 connected via a bus bar 200; end plates 300 supporting outermost unit cells 100; a side plate 400 connected to the end plates 300; a support member 500 supporting a lower end of the unit cells 100; and a welding bush 700 connecting the end plate 300 with the side plate 400.

The unit cells 100 consists of a rechargeable battery and may be arranged in a first direction (x-axis direction) to neighbor or be adjacent to each other, and may be electrically and mechanically connected to each other, thereby forming the rechargeable battery module. The bus bars 200 may be disposed above the rechargeable battery module to electrically couple the unit cells 100.

For example, in the rechargeable battery module, the bus bar 200 may connect a group of four neighboring unit cells 100 in parallel, and connect the group in series to other neighboring groups of four unit cells 100 connected in parallel.

The end plates 300 may support the outermost unit cells 100 and end supports 310 may be interposed between the end plates 300 and the outermost unit cells 100. The end supports 310 may be a pair of end supports 310, may be made of an electrically insulating material, and may be respectively disposed at opposite ends in an x-axis direction to support the outermost unit cells 100 while being insulated therefrom. The end plates 300 may be provided as a pair and may be respectively connected to outer edges of the end supports 310 to support the outermost unit cells 100 via the end supports 310.

The end plates 300 may be a metal, e.g., stainless steel, allowing the rechargeable battery module to have strength at outermost sides in the x-axis direction. The end supports 310 may electrically insulate the end plates 300 from the unit cells 100 while supporting the unit cells 100 inside the end plates 300.

The side plates 400 may be provided as a pair, be disposed at opposite ends of a second direction (y-axis direction) crossing the x-axis direction, and be connected to the end plate 300, the welding bush 700 interposed therebetween, thereby supporting the opposite ends of the unit cells 100 in the y-axis direction.

The end plate 300 and the side plate 400 may be connected to each other via the welding bush 700, and a top side of unit cells 100 accommodated in a space defined by the end supports 310 and the side plates 400 is covered by the bus bar holder 600. The bus bar holder 600 may include bus bar holes 610, and allows the bus bar 200 to be electrically coupled to the unit cell 100 via the bus bar holes 610.

The support member 500 may be disposed at a lower end of the unit cells 100 to support a lower part of the unit cells 100 that is accommodated in a space defined by the end plates 300 and the side plates 400. Accordingly, the unit cells 100 may be protected and supported on top and bottom sides by the bus bar holder 600 and the support member 500, and on sides by the end plates 300.

The welding bushes 700 may be extended in a third direction (z-axis direction) from opposite ends of the end plate 300 in a y-axis direction and from opposite ends of the side plate 400 in the x-axis direction, and may be disposed at four corners of the rechargeable battery module. That is, the welding bushes 700 may be connected to the end plate 300 and the side plate 400 by welding, and may be fixed to the support member 500 by the penetrating fastening members 710.

For example, the welding bush 700 may include a cylinder member 720 welded to the end plate 300 and the side plate 400, and a cap member 730 combined to upper and lower ends of the cylinder member 720.

The cap member 730 may be combined to the upper and lower ends of the cylinder member 720 to increase corresponding surface areas to which a load is applied. The cap member 730 may include an upper member 731 and a lower member 732.

The upper member 731 is combined to the upper end of the cylinder member 720 to increase a corresponding surface area for the fastening member 710. That is, the upper member 731 may increase a surface that contacts the fastening member 710. The lower member 732 may increase a corresponding surface area for the support member 500 or the cylinder member 720. That is, the lower member 732 may increase a surface that contacts the support member 500 or the cylinder member 720.

Figure 3:
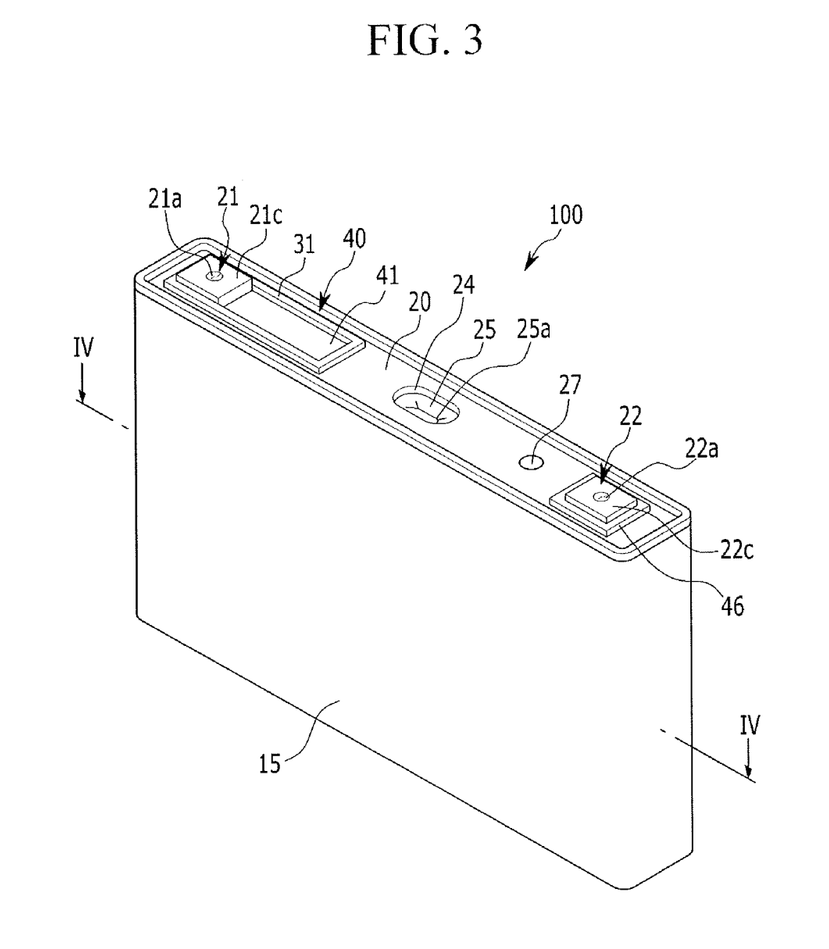
FIG. 3 illustrates a perspective view of a rechargeable battery applicable to FIG. 2.
Figure 4:
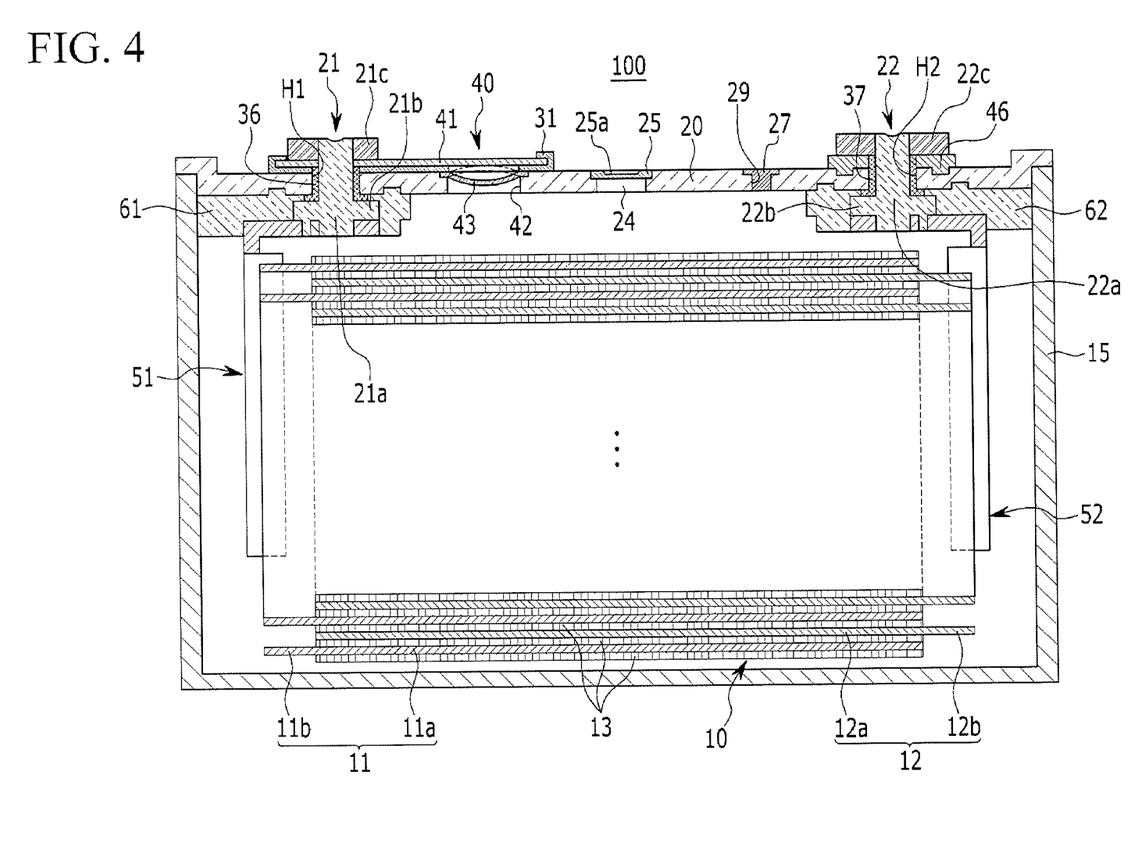
FIG. 4 illustrates a cross-sectional view of FIG. 3 taken along the line IV-IV.

FIG. 3 is a perspective view of a rechargeable battery applicable to FIG. 2, and FIG. 4 is a cross-sectional view of FIG. 3 taken along the line IV-IV. Referring to FIGS. 3 and 4, the unit cell 100 may be provided as the rechargeable battery for charging and discharging a current.

Each unit cell 100 may include: an electrode assembly 10; a case 15 for accommodating the electrode assembly 10; a cap plate 20 combined to an opening of the case 15; a first electrode terminal (hereinafter referred to as "negative electrode terminal") 21 and a second electrode terminal (hereinafter referred to as "positive electrode terminal") 22 which may be provided in the cap plate 20; and an external short-circuit portion 40 provided near the negative electrode terminal 21.

For example, the electrode assembly 10 may be formed by disposing the first electrode (hereinafter referred to as a "negative electrode") 11 and the second electrode (hereinafter referred to as a "positive electrode") 12 at opposite surfaces of a separator 13 serving as an insulator, and winding the negative electrode 11, the separator 13, and the positive electrode 12 in a jelly-roll state.

The negative and positive electrodes 11 and 12 may respectively include coated regions 11a and 12a where an active material is coated on a current collector of a metal plate, and uncoated regions 11b and 12b which may be formed as exposed current collectors since an active material is not coated thereon.

The uncoated region 11b of the negative electrode 11 may be formed at one end portion of the negative electrode 11 along the wound negative electrode 11. The uncoated region 12b of the positive electrode 12 may be formed at one end portion of the positive electrode 12 along the wound positive electrode 12. The uncoated regions 11*b* and 12*b* may be respectively disposed at opposite ends of the electrode assembly 10.

For example, the case 15 may have a substantial cuboid shape to set a space for accommodating the electrode assembly 10 and an electrolyte solution. The opening for interconnecting inner and outer spaces may be at one side of the cuboid. The opening allows the electrode assembly 10 to be inserted into the case 15.

The cap plate 20 may be provided in the opening of the case 15, to close and seal the opening of the case 15. The case 15 and the cap plate 20 may be welded to each other since they may be formed of a same material, for example, aluminum.

In addition, the cap plate 20 may include an electrolyte injection opening 29, a vent hole 24, and terminal holes H1 and H2. After the cap plate 20 is combined with the case 15, the electrolyte injection opening 29 allows the electrolyte solution to be injected into the case 15. After the injection of the electrolyte solution, the electrolyte injection opening 29 may be sealed by a sealing cap 27.

The vent hole 24 may be closed and sealed by a vent plate 25 so as to discharge internal pressure of the unit cell 100. When the internal pressure of the unit cell 100 reaches a predetermined pressure, the vent plate 25 is ruptured to open the vent hole 24. The vent plate 25 may be provided with a notch 25*a* that induces the rupture.

The bus bar holder 600 may further include a holder vent hole 624 corresponding to the vent hole 24 (refer to FIGS. 1 and 2). Accordingly, the internal pressure of the unit cell 100 discharged via the vent hole 24 may be discharged out of the rechargeable battery module via the holder vent hole 624. That is, discharge of the internal pressure via the vent hole 24 is not blocked by the bus bar holder 600.

The negative and positive electrode terminals 21 and 22 may be respectively provided in terminal holes H1 and H2 of the cap plate 20, and may be electrically coupled to the electrode assembly 10. That is, the negative electrode terminal 21 may be electrically coupled to the negative electrode 11 of the electrode assembly 10, while the positive electrode terminal 22 may be electrically coupled to the positive electrode 12 of the electrode assembly 10. The electrode assembly 10 is drawn out of the case 15 via the negative and positive electrode terminals 21 and 22.

Since the negative and positive electrode terminals 21 and 22 have the same structure inside the cap plate 20, the same structure will be describe together, and structures outside of the cap plate 20 will be respectively described since they have different structures.

The negative and positive electrode terminals 21 and 22 may include: rivet terminals 21*a* and 22*a* respectively provided in the terminal holes H1 and H2 of the cap plate 20; flanges 21*b* and 22*b* formed integrally with and wider than the rivet terminals 21*a* and 22*a* inside the cap plate 20; and plate terminals 21*c* and 22*c* disposed outside of the cap plate 20 to be coupled to the rivet terminals 21*a* and 22*a* by riveting or welding.

Negative and positive electrode gaskets 36 and 37 may be respectively provided between the rivet terminals 21*a* and 22*a* of the negative and positive electrode terminals 21 and 22 and inner surfaces of the terminal holes H1 and H2, thereby sealing and electrically insulating between the rivet terminals 21*a* and 22*a* of the negative and positive electrode terminals 21 and 22 and the cap plate 20.

The negative and positive electrode gaskets 36 and 37 may be further extended between the flanges 21*b* and 22*b* and an inner surface of the cap plate 20 to further seal and electrically insulate between the flanges 21*b* and 22*b* and the cap plate 20. That is, the negative and positive electrode gaskets 36 and 37 prevent leakage of the electrolyte solution via the terminal holes H1 and H2 when the negative and positive electrode terminals 21 and 22 are provided in the cap plate 20.

Negative and positive electrode lead tabs 51 and 52 may electrically couple the negative and positive electrode terminals 21 and 22 to the negative and positive electrodes 11 and 12 of the electrode assembly 10, respectively. That is, the negative and positive electrode lead tabs 51 and 52 may be combined to lower ends of the rivet terminals 21*a* and 22*a* and the lower ends thereof may be then caulked, for example, such that the negative and positive electrode lead tabs 51 and 52 may be supported by the flanges 21*b* and 22*b* and may be connected to the lower ends of the rivet terminals 21*a* and 22*a*, respectively.

Negative and positive electrode insulating members 61 and 62 may be respectively provided between the negative and positive electrode lead tabs 51 and 52 and the cap plate 20 to electrically insulate the negative and positive electrode lead tabs 51 and 52 from the cap plate 20. In addition, one side of each of the negative and positive electrode insulating members 61 and 62 is combined to the cap plate 20 while the other side thereof encloses the negative and positive electrode lead tabs 51 and 52, the rivet terminals 21*a* and 22*a*, and the flanges 21*b* and 22*b*, thereby stabilizing a connecting structure therebetween.

The external short-circuit portion 40 will be described in connection with the plate terminal 21*c* of the negative electrode terminal 21, and a top plate 46 will be described in connection with the plate terminal 22*c* of the positive electrode terminal 22.

The external short-circuit portion 40 adjacent to the negative electrode terminal 21 may include a short-circuit tab 41 and a short-circuit member 43 that may be separated from or short-circuited to each other depending on the internal pressure. The short-circuit tab 41 is electrically coupled to the rivet terminal 21*a* of the negative electrode terminal 21, and is disposed outside the cap plate 20, an insulating member 31 interposed therebetween.

The insulating member 31 may be provided between the short-circuit tab 41 and the cap plate 20 to electrically insulate the short-circuit tab 41 from the cap plate 20. That is, the cap plate 20 continues to be electrically insulated from the negative electrode terminal 21.

The short-circuit tab 41 and the plate terminal 21*c* may be combined to an upper end of the rivet terminal 21*a* and the upper end thereof is then caulked, for example, such that the short-circuit tab 41 and the plate terminal 21*c* may be combined to the upper end of the rivet terminal 21*a*. Accordingly, the short-circuit tab 41 and the plate terminal 21*c* may be fixed to the cap plate 20, the insulating member 31 interposed therebetween.

The short-circuit member 43 is provided in the short-circuit hole 42 formed in the cap plate 20 to close and seal the short-circuit hole 42. The short-circuit tab 41 is connected to the negative electrode terminal 21 and is extended along an edge of the short-circuit member 43. Accordingly, the short-circuit tab 41 and the short-circuit member 43 may correspond to the short-circuit hole 42 and may face each other. The short-circuit tab 41 and the short-circuit member 43 may continue to be separated from each other (as indicated by a solid line at 43 in FIG. 4), or may be short-circuited (as indicated by a dashed imaginary line in FIG. 4) since the short-circuit member 43 may be inversely deformed as the internal pressure of the unit cell 100 increases.

The top plate 46 adjacent to the positive electrode terminal 22 may electrically couple the plate terminal 22c of the positive electrode terminal 22 to the cap plate 20. For example, the top plate 46 may be interposed between the plate terminal 22c and the cap plate 20, and may be penetrated by the rivet terminal 22a.

Accordingly, the top plate 46 and the plate terminal 22c may be combined to an upper end of the rivet terminal 22a and the upper end thereof is then caulked, for example, the top plate 46 and the plate terminal 22c may be combined to the upper end of the rivet terminal 22a. The plate terminal 22c is provided outside the cap plate 20, the top plate 46 interposed therebetween.

The positive electrode gasket 37 is extended between the rivet terminal 22a and the top plate 46. The positive electrode gasket 37 prevents the rivet terminal 22a and the top plate 46 from being electrically connected directly to each other. That is, the rivet terminal 22a may be electrically coupled to the top plate 46 via the plate terminal 22c.

Referring back to FIGS. 1 and 2, in the rechargeable battery module, the side plate 400 may include penetration holes 413 at sides of the unit cells 100. The penetration holes 413 reduce a weight of the side plate 400 and the rechargeable battery module.

A plurality of penetration holes 413 may be provided along the x-axis and the z-axis. The plurality of penetration holes 413 may be formed as long as strength of the side plate 400 is maintained, thereby reducing the weight of the side plate 400.

The side plate 400 may be, for example, a thin plate sheet metal of a predetermined thickness (e.g., about 0.8 mm). For example, the side plate 400 may be formed of a thin stainless steel plate.

In addition, the side plate 400 may include a flange 420 that is bent from a lower end portion in the third direction (z-axis direction) crossing the x and y-axis directions to be directed toward the y-axis direction and to support the unit cells 100.

In the rechargeable battery module, the flange 420 may support the lower end of the unit cells 100 along with the support member 500. For example, the support member 500 may be formed as a pack bottom plate for supporting the unit cells 100 or a cooling plate included in an apparatus.

In addition, when the rechargeable battery module is mounted on an apparatus (e.g., electric vehicle), the flange 420 may allow the unit cells 100 to be adhered to a cooling plate (not shown) included in the apparatus, thereby enabling effective cooling.

A cutout connection portion 430 may be provided at an upper end of the side plate 400 opposite the flange 420. The connection portion 430 may be elastically connected to the bus bar holder 600 since it includes an elastic portion 431 and, thus, has an elastic force toward the bus bar holder 600 from the side plate 400.

The connection portion 430 may be connected to a bracket 620 provided at a corresponding position of the bus bar holder 600 by welding, for example. When the bus bar holder 600 is formed of a synthetic resin serving as an electrically insulating material, for example, the bracket 620 may be insert-molded to be provided in the bus bar holder 600.

The elastic force of the elastic portion 431 may absorb or allow adjustment due to tolerances of components of the side plate 400 and the bus bar holder 600. When being laser-welded, for example, the connection portion 430 and the bracket 620 may closely contact each other, thereby ensuring welding performance and improving welding quality.

In the rechargeable battery module, the bus bar holder 600 may include coupling grooves 640 that may be disposed at opposite ends in the y-axis direction and that may be formed along the x-axis direction and be separated from each other in the z-axis direction. The side plate 400 may include coupling portions 440 that may be coupled to the coupling grooves 640. When the coupling portions 440 are coupled to the coupling grooves 640, a fastening force in the z-axis direction is generated between the side plate 400 and the bus bar holder 600.

The unit cells 100 may be covered by the bus bar holder 600, and may be connected to the bus bar 200 via the bus bar holes 610. The end plates 300 and the side plates 400, with the end supports 310 interposed therebetween, may be connected to each other such that the unit cells 100 may be accommodated and supported. Subsequently, the connection portion 430 of the side plate 400 may be, for example, welded to the bracket 620 of the bus bar holder 600, thereby completing the rechargeable battery module.

That is, sides of the unit cells 100 may be supported by the end plate 300 and the side plate 400, a top side thereof may be supported by the bus bar holder 600, and a bottom side thereof may be supported and accommodated by the flange 420 of the side plate 400 and the support member 500.

Figure 5:
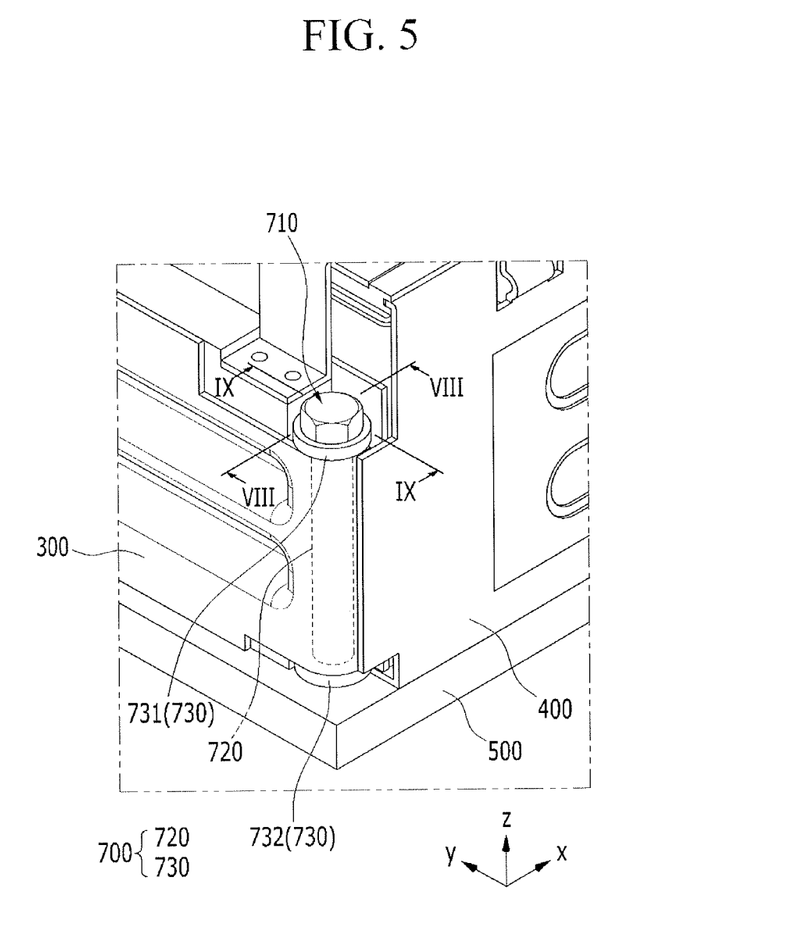
FIG. 5 illustrates a partial perspective view of FIG. 1.
Figure 6:
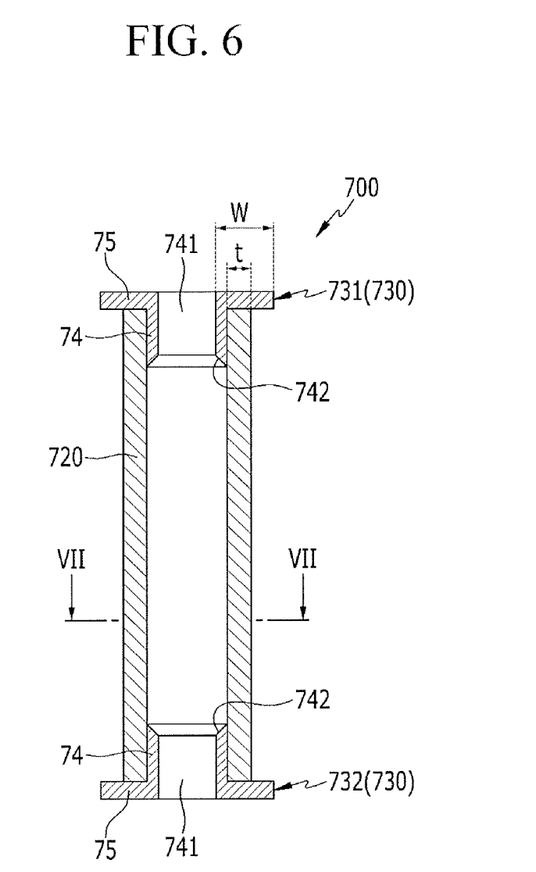
FIG. 6 illustrates a cross-sectional view of a welding bush applicable to the rechargeable battery module according to the exemplary embodiment.
Figure 7:
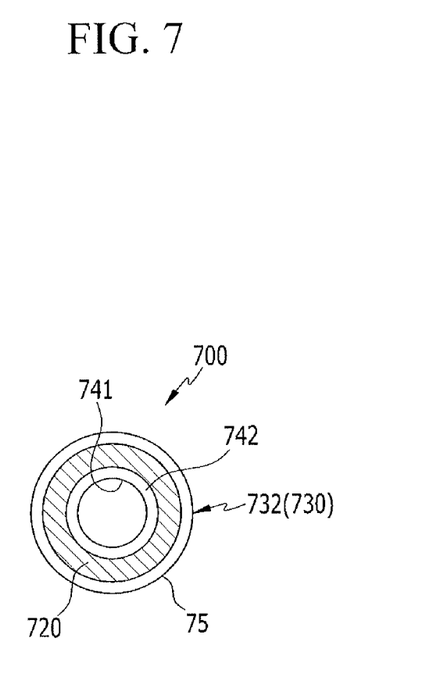
FIG. 7 illustrates a cross-sectional view of FIG. 6 taken along the line VII-VII.

FIG. 5 is a partial perspective view of FIG. 1, FIG. 6 is a cross-sectional view of a welding bush applicable to the rechargeable battery module according to the exemplary embodiment, and FIG. 7 is a cross-sectional view of FIG. 6 taken along the line VII-VII.

Referring to FIGS. 5 to 7, in the welding bush 700 of the rechargeable battery module, the cylinder member 720 may be connected to one end of the end plate 300 and one end of the side plate 400 by welding, for example.

The cap member 730 (upper and lower members 731 and 732) may include an insertion portion 74 combined to an inner circumferential surface of the cylinder member 720, and a flange portion 75 extended outward from one side of the insertion portion 74. The insertion portion 74 may include a through-hole 741 at a center, allowing the fastening member 710 to penetrate via the center. The flange portion 75 is extended outward of the through-hole 741 from an end portion of the insertion portion 74, and supports the end of the cylinder member 720.

The insertion portion 74 may have an inclined surface 742 that is formed at the inner circumferential surface of the cylinder member 720 to be inclined based on a diametrical center. That is, the inclined surface 742 is connected to or in communication with the through-hole 741 while being inclined thereto, and induces or facilitates insertion of the fastening member 710.

Figure 8:
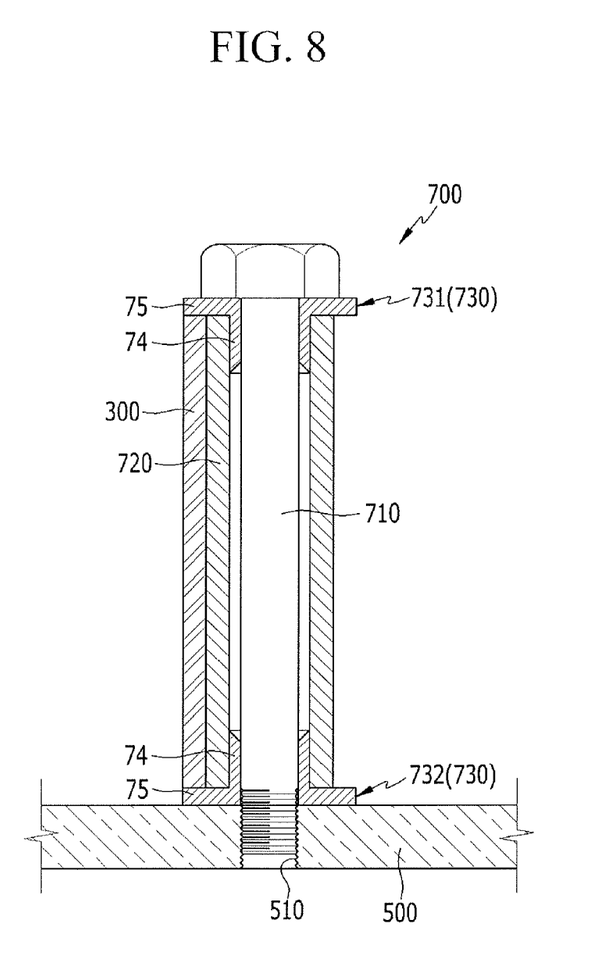
FIG. 8 illustrates a cross-sectional view of FIG. 5 taken along the line VIII-VIII.

The fastening member 710 is fastened with a fastening hole 510 of the support member 500 by penetrating the cap member 730, the cylinder member 720, and the through-hole 741 of the insertion portion 74 (refer to FIGS. 2 and 8).

Figure 9:
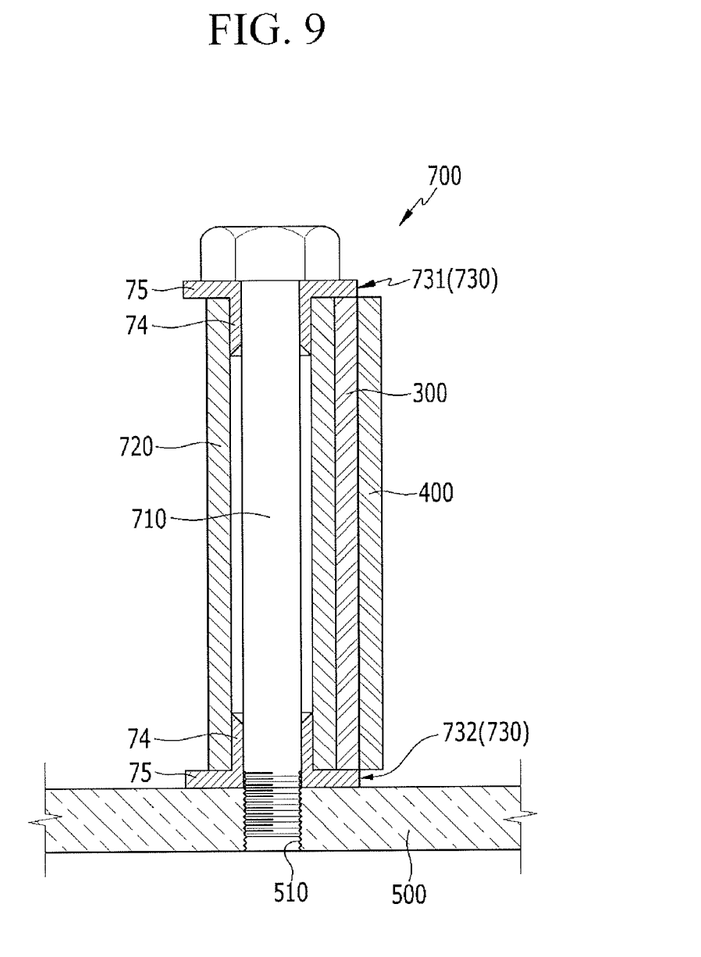
FIG. 9 illustrates a cross-sectional view of FIG. 5 taken along the line IX-IX.

FIG. 8 is a cross-sectional view of FIG. 5 taken along the line VIII-VIII, and FIG. 9 is a cross-sectional view of FIG. 5 taken along the line IX-IX. Referring to FIGS. 5 to 9, the fastening member 710 may be formed as a bolt.

The fastening member 710 may be screw-coupled to the fastening hole 510 of the support member 500 by penetrating the through-hole 741 of the insertion portion 74 in the upper member 731 provided at the upper end of the cylinder member 720, passing through the cylinder member 720, and then penetrating the through-hole 741 of the insertion portion 74 in the lower member 732.

The flange portion 75 may have a width (W) that is greater than a thickness (t) of the cylinder member 720 in a diametrical direction of the cylinder member 720 (refer to FIG. 6). A bolt head of the fastening member 710 is supported by the flange portion 75 in the cap member 730 (upper member 731) that is provided at the upper end (FIGS. 8 and 9). In this case, the flange portion 75 increases the corresponding surface area that corresponds to the fastening member 710.

In the cap member 730 (lower member 732) provided at the lower end of the cylinder member 720, the flange portion 75 is supported by the support member 500 (FIGS. 8 and 9). In this case, the flange portion 75 increases a corresponding surface area that corresponds to the support member 500 or the cylinder member 720.

That is, since the cylinder member 720 may have a smaller thickness than a width (W) of the flange portion 75, a weight may be reduced by the area corresponding to a difference between the width (W) and the thickness (t). Even in this case, since the welding bush 700 has the width (W) according to the flange portion 75 via the cap member 730, the corresponding surface area to which the load is applied may be increased.

Accordingly, in the rechargeable battery module of the exemplary embodiments, the area of the unit cells 100 is fixed or secured as much as possible in the limited space without increasing the space associated with the welding bush 700, thereby maximizing efficiency.

The support member 500 may be formed of aluminum, for example, the cylinder member 720 may be formed of stainless steel, for example, and the cap member 730 may be formed of steel having lower strength than the cylinder member 720, for example. Accordingly, the cap member 730 having the lower strength may prevent or reduce damage to the support member 500 associated with the strength of the cylinder member 720.

Referring to FIGS. 8 and 9, one end of the end plate 300 makes curved-surface contact with the cylinder member 720 and may be welded thereto, for example. That is, the end plate 300 and the cylinder member 720 may be welded over a large area.

In addition, one end of the side plate 400 may make line contact with the cylinder member 720 to be welded thereto, for example. Further, as illustrated, one end of the side plate 400 may make line contact with the end plate 300 forming a curved surface to be welded thereto.

By way of summation and review, a rechargeable battery module may be formed by arranging a plurality of unit cells in one direction, including end plates at opposite ends of unit cells in a direction where the unit cells are arranged, including side plates at opposite sides in a direction where the unit cells are arranged, and then welding the end plates and the side plates together.

In this case, cylinder-shaped welding bushes are used. That is, the end plate is welded to one side of the welding bush, and the side plate is welded to the other side of the welding bush. Inner and exterior diameters of the cylinder shaped welding bush that are used in this case have predetermined sizes. However, the welding bush should be lightweight, and corresponding surface areas at opposite ends of the welding bush to which a load is applied should be wide.

Exemplary embodiments may provide a rechargeable battery module capable of achieving a maximum output, despite a condition where a welding bush for connecting an end plate with a side plate has a structural limitation, by forming a lightweight welding bush and increasing a corresponding surface area to which a load is applied. That is, exemplary embodiments may provide a rechargeable battery module with maximized efficiency.

In the exemplary embodiments, since the welding bush for connecting the end plate with the side plate is formed as the cylinder member and the cap member, the welding bush may be formed to be lightweight, and the separate cap member may be used to increase the corresponding surface areas (corresponding surface areas for the fastening member and/or the support member) to which the load due to fastening of the fastening member is applied.

In the exemplary embodiments, in a limited space where one end of the end plate and one end of the side plate are connected, since the area of the cap member is increased in response to the reduced exterior diameter of the cylinder member, the corresponding surface areas to which the load is applied by the fastening of the fastening member may be increased. Accordingly, the area occupied by the unit cells in the rechargeable battery module may not be decreased. That is, since the area occupied by the unit cells is maximally maintained in the limited space, efficiency of the rechargeable battery module may be maximized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery module, comprising:
   a plurality of unit cells arranged in a first direction and electrically coupled via a bus bar, including a pair of outermost unit cells at opposite ends of the first direction;
   an end plate to support one of the outermost unit cells;
   side plates provided at opposite ends of a second direction crossing the first direction to support side surfaces of the unit cells;
   a support member supporting the unit cells at a lower end of a third direction crossing the second direction; and
   welding bushes extended in the third direction at opposite ends of the end plate in the second direction and opposite ends of the side plates in the first direction, the welding bushes being connected to the end plate and the side plates, and combined with the support member by a penetrating fastening member,
   wherein each welding bush includes:
      a cylinder member to which the end plate and one of the side plates are welded, and
      a cap member combined with at least one of opposite ends of the cylinder member, the cap member including:
         an insertion portion combined with an inner circumferential surface of the cylinder member, and a flange portion extending outwardly from one side of the insertion portion and supporting an end portion of the cylinder member, wherein a through hole is formed at a center of the insertion portion and the flange portion, and wherein the fastening member penetrates the cap member and the cylinder member, the fastening member having an outer diameter that corresponds to an inner diameter of the insertion hole of the cap member and is less that an inner diameter of the cylinder member.

2. The rechargeable battery module as claimed in claim 1, wherein the cylinder member is connected to one end of the end plate and one end of one of the side plates.

3. The rechargeable battery module as claimed in claim 1, wherein one end of the end plate makes curved-surface contact with the cylinder member to be welded thereto, and one end of one of the side plates makes line contact with an end portion of the cylinder member or the end plate to be welded thereto.

4. The rechargeable battery module as claimed in claim 1, wherein the flange portion has a width that is greater than a thickness of the cylinder member in a diameter direction of the cylinder member, such that the cap member increases a corresponding surface area to which a load is applied.

5. The rechargeable battery module as claimed in claim 1, wherein the insertion portion has an inclined surface that is inclined at the inner circumferential surface of the cylinder member with respect to a diametrical center thereof.

6. The rechargeable battery module as claimed in claim 1, wherein the fastening member is fastened with a fastening hole of the support member.

7. The rechargeable battery module as claimed in claim 6, wherein:

the fastening member is a bolt that penetrates the through-hole of the insertion portion in the cap member provided at an upper end of the cylinder member to be screw-coupled to the fastening hole of the support member.

8. The rechargeable battery module as claimed in claim 7, wherein a bolt head of the fastening member is supported by the flange portion of the cap member provided at the upper end of the cylinder member.

9. The rechargeable battery module as claimed in claim 8, wherein a flange portion of a lower cap member that is provided at a lower end of the cylinder member is supported by the support member.

10. The rechargeable battery module as claimed in claim 6, wherein the support member is a cooling plate provided in a bottom plate of a pack or an apparatus for supporting the unit cells.

11. The rechargeable battery module as claimed in claim 6, wherein the support member is formed of aluminum, the cylinder member is formed of stainless steel, and the cap member is formed of steel having lower strength than the cylinder member.

12. The rechargeable battery module as claimed in claim 1, wherein the cap member includes an upper member combined to an upper end of the cylinder member to increase a corresponding surface area for the fastening member, and a lower member combined to the lower end of the cylinder member to increase a corresponding surface area for the support member.

* * * * *